April 5, 1932.  W. L. MURPHY  1,852,623
BED
Filed June 3, 1929  3 Sheets-Sheet 1
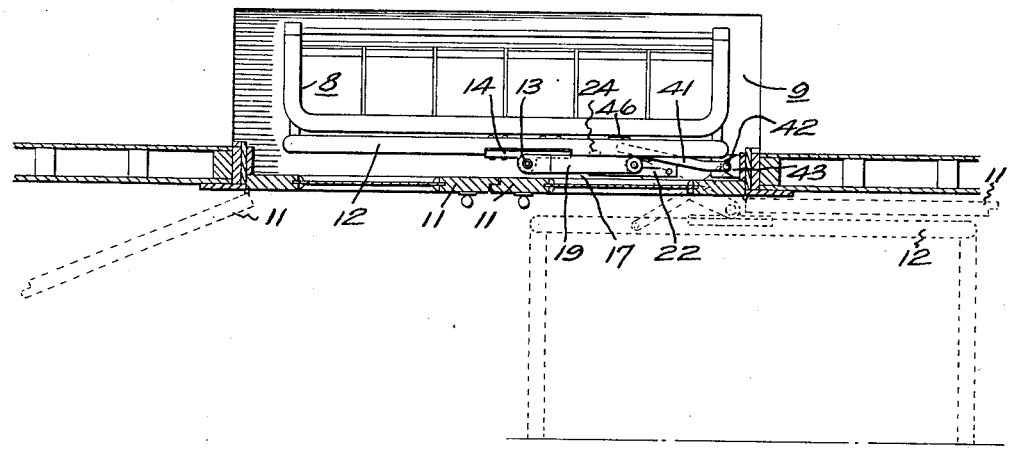
FIG. 2.
FIG. 1.
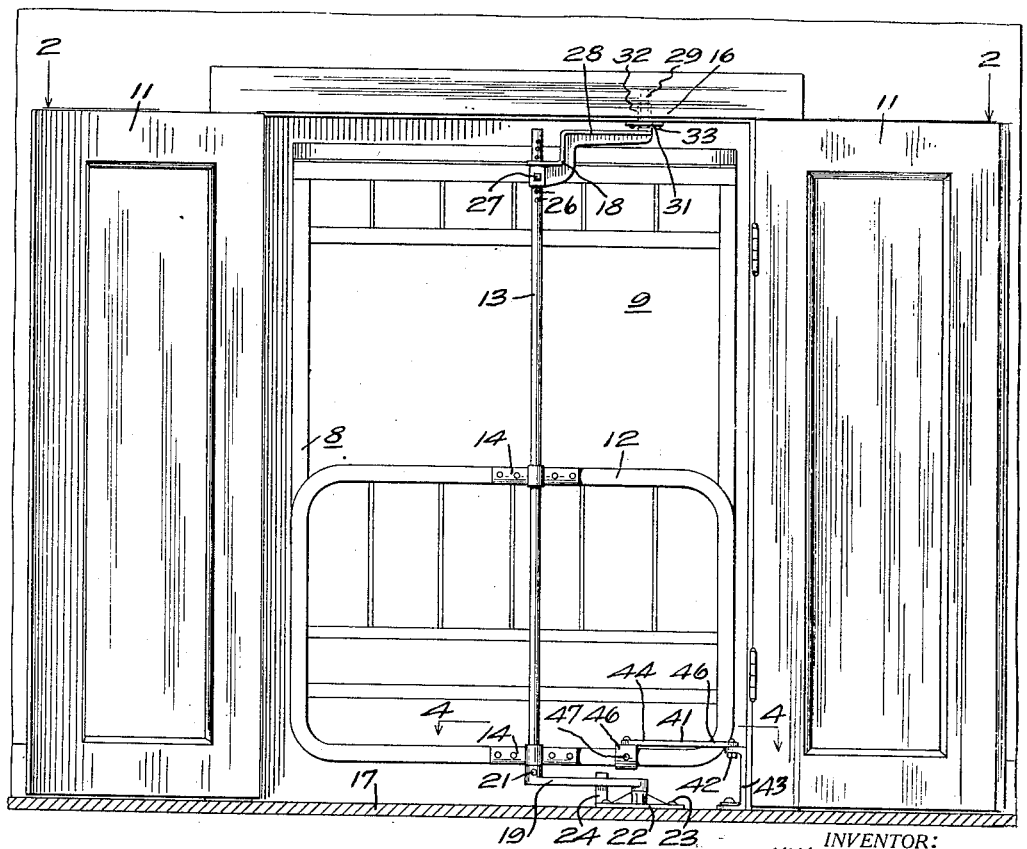
INVENTOR:
William L. Murphy
BY White, Prost & Fryer
ATTORNEYS April 5, 1932.   W. L. MURPHY   1,852,623
BED
Filed June 3, 1929   3 Sheets-Sheet 2
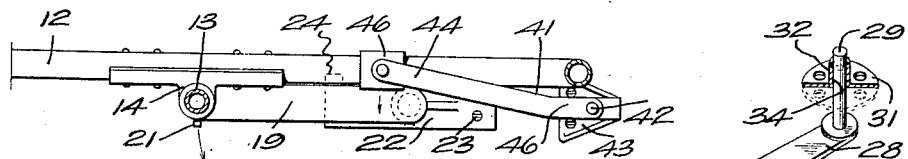
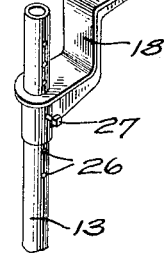
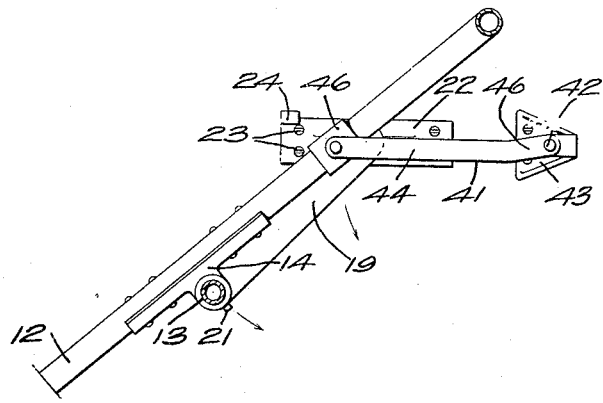
INVENTOR:
William L. Murphy
BY White, Prost & Fryer
ATTORNEYS.

April 5, 1932.   W. L. MURPHY   1,852,623
BED
Filed June 3, 1929   3 Sheets-Sheet 3

INVENTOR:
William L. Murphy
BY White, Prost & Fryer
ATTORNEYS.

Patented Apr. 5, 1932

1,852,623

UNITED STATES PATENT OFFICE

WILLIAM L. MURPHY, OF NEW YORK, N. Y., ASSIGNOR TO MURPHY WALL BED CO., OF SAN FRANCISCO, CALIFORNIA, A CORPORATION OF CALIFORNIA

BED

Application filed June 3, 1929. Serial No. 367,891.

My invention relates to wall beds, particularly those which are adapted to be confined in a recess and withdrawn for use when desired.

It is an object of my invention to provide a standard form of wall bed in such a manner that it can subsequently be readily installed in various of the different recesses which are ordinarily provided.

Another object of my invention is to provide a wall bed which can be positioned in a closet with an advantageous disposition of the closet space.

A further object of my invention is to provide a wall bed which can be moved into and out of a recess no deeper than the bed.

A further object of my invention is to provide a wall bed which may be advantageously positioned in a room.

My invention possesses other advantageous features, some of which with the foregoing will be set forth at length in the following description where I shall outline in full that form of the bed of my invention, which I have selected for illustration in the drawings accompanying and forming part of the present specification. In said drawings I have shown one form of bed embodying my invention, but it is to be understood that I do not limit myself to such form since the invention, as set forth in the claims, may be embodied in a plurality of forms.

In the drawings, to which I have made reference,

Fig. 1 is a front elevation of a bed collapsed and positioned in a recess.

Fig. 2 is a plan view of the wall bed shown in Fig. 1, the view being taken along the top of the recess as indicated by lines 2—2.

Fig. 3 is a perspective view of a device utilized in conjunction with the wall bed of my invention.

Fig. 4 is a cross section through the device shown in Fig. 1 along the line 4—4.

Figs. 5, 6 and 7 illustrate the various positions through which the wall bed is moved out of the recess.

Figure 6:
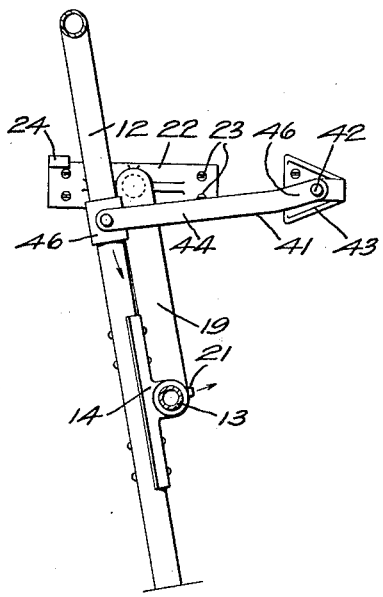
Figure 7:
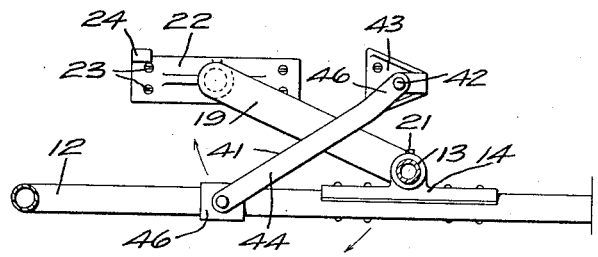

My invention may be briefly characterized as comprising a wall bed which is capable of being positioned in various of the recesses usually provided. These recesses vary considerably in height and are of relatively narrow width.

It is expedient, because of the great value placed upon space in building construction today, that equipment of the character herein considered be capable of being positioned in as small and compact a space as is possible. Builders heretofore have provided such relatively small closets or recesses that difficulties and inconveniences were sometimes occasioned when a wall bed was subsequently installed in the closet or recess. The lack of space resulted in an inconvenience when access to the closet was desired and when clothes were hung about the closet. Furthermore, the bed could not usually be advantageously provided with respect to the closet, the room in which it was to be unfolded, or with doors and hallways. These disadvantages are obviated in the bed which I am here about to disclose.

In the preferable form of my invention which I have here disclosed, a bed 8 of the usual folding type is adapted to be positioned in a closet or recess 9. When the bed is folded up and is within the recess, doors 11 are usually closed, as is shown in Fig. 2, to separate the closet from the adjoining room.

To support the bed and to provide for its movement, the head portion 12 of the bed is conveniently fastened to a rod 13 by suitable brackets 14. These brackets prevent the bed from sliding along the rod while allowing the bed to be rotated with respect to it. The rod is suitably secured to the upper frame 16 of the recess and to the floor 17 of the recess by upper and lower arms 18 and 19 respectively. One end of lower arm 19 is usually attached to the end of the rod by bolt 21. The other end of the arm is carried pivotally in a plate 22 which is securely affixed to the floor by screws 23. To limit the movement of the arm 19 an upstanding lip 24 is conveniently provided upon the plate 22.

The installation of the bed in recesses of various heights is facilitated by the provision of mechanism for adjusting the bed mounting to the height of the recess. This is preferably accomplished by providing the upper end of the rod 13 with a plurality of apertures 26. Since the arm 18, as is shown in Fig. 3, is capable of sliding along the rod 13 the arm can be secured in any selected one of various positions along the rod by passing bolt 27 through the arm and through one of the apertures. To accommodate the bed to heights in excess of the length of the rod I preferably offset end 28 of the arm. This permits of adjustment being made to practically any desired height. To accomplish the adjustment to a nicety I preferably position upon the offset end 28 a relatively long member 29. A plate 31 provided with a relatively short bearing 32 is preferably positioned upon this member and adapted to be rotated relative to it. The member and the short bearing on the plate are usually inserted in a suitable aperture provided in the upper frame 16 of the recess. The bearing plate is then secured in place by screws 33 which are inserted through apertures 34 in the plate. It is to be noted that since the member 29 is of a greater length than the bearing provided upon the plate that the final adjustment to the height of the recess is cared for by the sliding of the plate along the member 29.

I prefer that the axes of the bearing member 29 and the pivotal connection of arm 19 to floor plate 22 be in alignment with each other and relatively close to the edge of the recess. In this manner I am enabled to position the folding bed within the recess in such a manner that access may be had to the recess when the bed is in position in it without opening both the doors and pulling the bed out into the room. When the bed is in the recess, as is shown in Figs. 1 and 2, a sufficient distance remains for the passage of a person into the closet.

Since the pivotally mounted arms 18 and 19 are both affixed to the rod 13 and since the bed 8 is movable with respect to the rod, the bed can be rotated about two axes. One of these is the axis of the pivots of the arms to which the rod is attached. The other is the axis of the rod. Thus the bed can be withdrawn from the recess in such a manner that it is positioned for unfolding in the room. However, the course of the bed in such an instance is a haphazard one and the person moving the bed must necessarily exercise a good deal of care as to the relative movement of the bed about the several axes.

Preferably to constrain the movement of the bed to a definite course I provide means for accomplishing the movement of the bed from its reversed position in the recess to a position in the room from which it may be readily unfolded. This I preferably accomplish with a guide lever 41 pivotally affixed by a bolt 42 to a bracket 43 provided at the edge of the recess. The lever 41 is preferably formed of two angularly disposed portions 44 and 46 so related that the arm is readily suited to the space condition under which it operates. The portion 44 of the lever is preferably pivotally attached to a collar 46 affixed to the head 12 of the bed by studs 47. This lever constrains the movement of the bed to a definite fixed path with respect to the axis of its pivotal point on the brackets 43.

The movement of the bed is probably best understood by reference to Figs. 4 to 7 inclusive. As is particularly shown in Fig. 4 the normal position of the bed when within the recess is with the pivotal connection of the arm 19 and the bracket 43 in substantial alignment. The arm 19 is further in abutment with the lip 24 which serves to limit the movement of the bed into the recess. Upon the application of a force to the bed to move it out into the room, an initial rotation is first effected much in the manner shown in Figs. 5 and 6. The arm 19 constrains the bed about the pivotal axes of the arms holding the rod while the arm 41 constrains the head of the bed to a limited path. After the two arms have crossed, as is shown in Fig. 6, and their points of action become reversed, the bed moves farther out of alignment with the arm 19 until it has assumed the position shown in Fig. 7. In this position it is adapted to be unfolded in the room. The moving of the arm 19 from alignment with the bed together with the angular restraint placed upon the bed by the arm 41 finally results in the bed assuming a position at a distance from the pivots of the arms in the several bases to which they are affixed. This spaces the bed from the wall and door. Furthermore, it is to be noted that the bed is so positioned in the room that free and ready access is provided to the closet when the bed is unfolded. The bed also assumes a most advantageous position with respect to adjacent walls, doors or halls. Thus, as is particularly shown in Fig. 2, the bed extends only for a limited distance along the wall. In fact usually no further than the adjacent door 11. This is a material advantage in apartments where spacing and space requirement are of importance.

I claim:

1. In combination, a wall bed rotatably mounted upon a vertical rod and disposed, when in closed position, within a closet parallel to the entrance way of the latter, upper and lower horizontal lever arms connected to said rod adjacent opposite ends thereof and pivoted respectively at the top and bottom of the closet adjacent said entrance way to one side of said rod, said rod and arms enabling swinging of the bed to a position outside the closet substantially at 180° to its closed position within the closet and shifting the bed laterally to obstruct only a portion of said entrance way, and a horizontal guide lever hinged to the bed on said side of the rod and pivoted in the corresponding side of the closet adjacent said entrance way, said guide lever operating during the outward motion of the bed in conjunction with said lever arms to rotate the bed through 180° and to shift the bed laterally.

2. In combination, a wall bed disposed, when in closed position, within a closet parallel to and directly behind the entrance way of the latter, said entrance way being at least as wide as said bed, means upon which the bed is rotatable on a vertical axis, said means being within the closet when the bed is in closed position within the closet, additional means pivoting the bed at a fixed point within the closet to one side of the first-mentioned means whereby the bed may be swung to a position outside the closet substantially at 180° to its closed position within the closet and may be shifted laterally to uncover a substantial portion of said entrance way, and a guide lever pivoted in the closet on said side of the first-mentioned means and hinged to the corresponding side of the bed, said guide lever operating during the outward motion of the bed in conjunction with said additional means to rotate the bed through 180° and to shift the bed laterally.

3. In combination, a wall bed disposed, when in closed position, within a closet parallel to and directly behind the entrance way of the latter, said entrance way being at least as wide as said bed, means upon which the bed is rotatable on a vertical axis, said means being within the closet and adjacent said entrance way when the bed is in closed position within the closet, additional means pivoting the bed at a fixed point within the closet adjacent said entrance way and to one side of the first-mentioned means whereby the bed may be swung to a position outside the closet substantially at 180° to its closed position within the closet and may be shifted laterally to uncover a substantial portion of said entrance way, and a guide lever pivoted in the closet adjacent said entrance way on said side of the first-mentioned means and hinged to the corresponding side of the bed, said guide lever operating during the outward motion of the bed in conjunction with said additional means to rotate the bed through 180° and to shift the bed laterally.

4. A wall bed adapted to move from a first position to a second position parallel to said first position and laterally displaced therefrom comprising a bed frame, a support, a lever arm pivoted adjacent the center of said bed frame and pivoted to said support at a point between said center and one end of said frame, said arm enabling swinging of the bed from a first position through substantially a half revolution to a second position parallel to the first position and laterally displaced therefrom, and a guide lever pivoted to said bed frame between said center and said end and pivoted to said support at a point adjacent said end, said guide lever operating during the movement of said bed frame in conjunction with said lever arm to rotate the bed frame through a half revolution and to shift the bed frame laterally.

In testimony whereof, I have hereunto set my hand.

WILLIAM L. MURPHY.